United States Patent Office 3,436,007
Patented Apr. 1, 1969

3,436,007
CONTAINER WALL SECTION
Anders Ruben Rausing, Blentarp, Sweden, assignor to Tetra Pak Rausing & Co., KG., Hochheim, Germany, a company of Germany
Filed Oct. 16, 1967, Ser. No. 675,549
Claims priority, application Sweden, Nov. 4, 1966, 15,119/66
Int. Cl. B65d *3/00, 5/56, 5/40, 5/62, 25/14, 5/58, 5/60, 5/00, 1/00*
U.S. Cl. 229—14     6 Claims

ABSTRACT OF THE DISCLOSURE

A container has a laminated wall section constituted by a barrier layer made from any suitable material such as aluminum coated on both sides with a thermoplastic such as polyethylene. The laminate is single or double pleated to establish the desired configuration for the wall and is then heated to cause all of the thermoplastic surfaces lying adjacent each other in the pleats to melt and adhere to one another.

---

The present invention concerns a container wall section consisting of a laminate containing at least one layer of a thermoplastic material and one layer of material possessing satisfactory barrier properties, characterized by the laminate being folded, and by the folds, through the melting together of the thermoplastic surfaces, being effectively joined to one another within at least a limited area. The invention also refers to a container consisting of such a container wall section.

Figure 1:
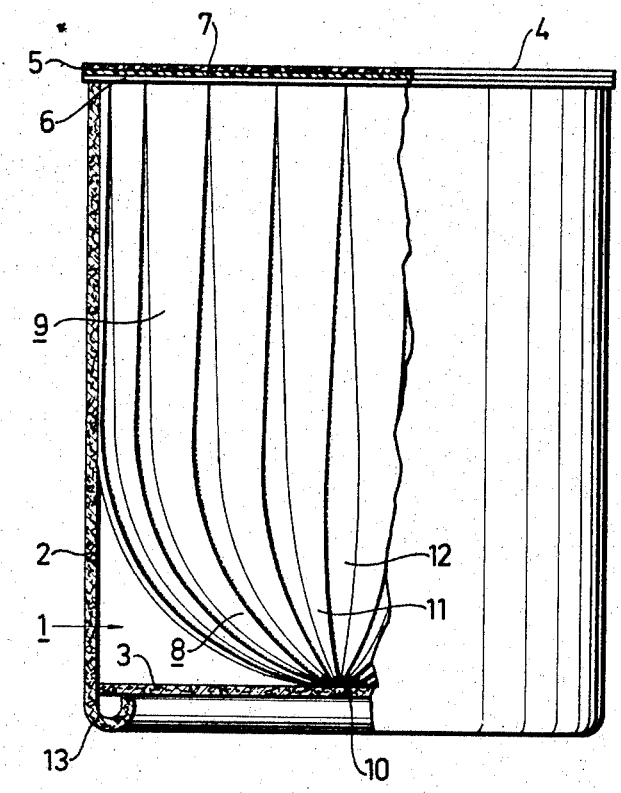

The advantages of the invention and its two preferred constructional forms will now more closely be explained with reference to the attached figures, of which FIG. 1 shows a side view of a container constructed in accordance with the principles of the invention, the container being held in an outer sleeve which in the figure has partly cutaway, the better to show the inner container.

Figure 2:
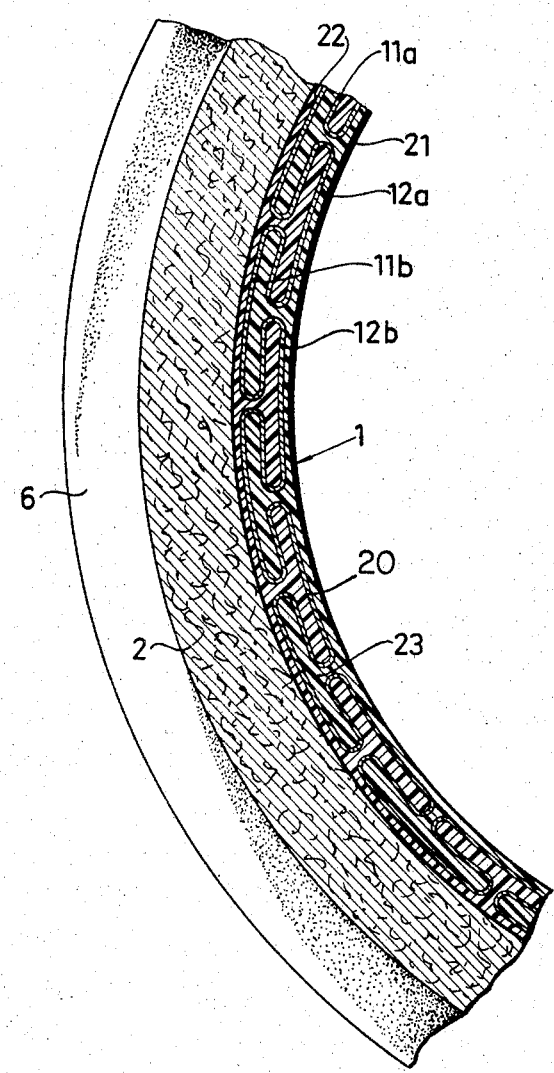
Figure 3:
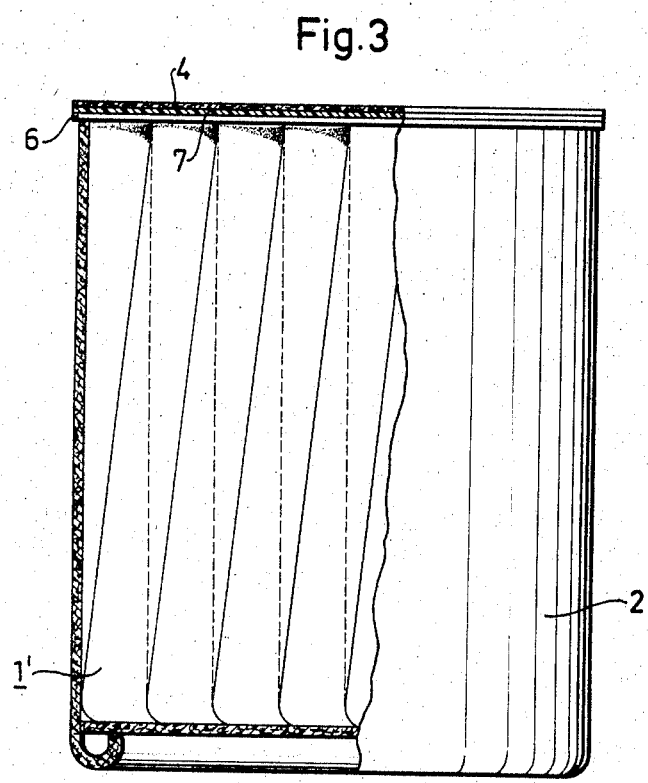
Figure 4:
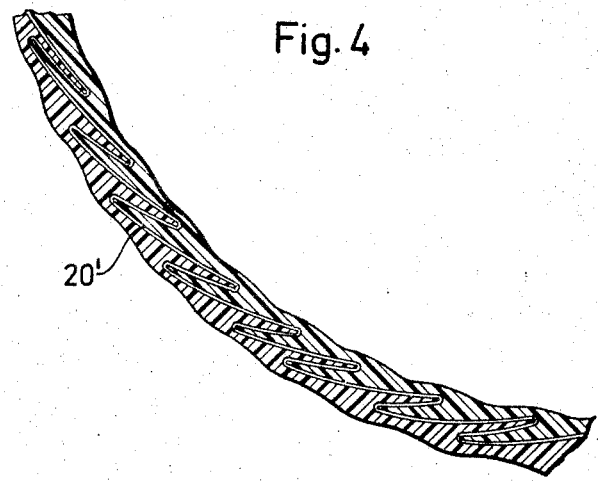

FIG. 2 shows a section through the upper portion of the combined package illustrated in FIG. 1, the radial dimensions being greatly exaggerated in the figure in order that it should be easier to distinguish the various layers, FIG. 3 shows another constructional form in conformity with the invention; and FIG. 4 shows a section through the upper portion of the inner container illustrated in FIG. 3.

The package illustrated in FIG. 1 comprises a container 1 with a cover 4 of the same material as the container but with an outer stiffener as well as a stiffener, in the shape of a sleeve 2 with a base 3, surrounding the container. The cover 4 is welded to container 1 by means of a weld 5 which joins the cover to an upper flange on container 1. In order to improve the weld, a ring or disc 7 of the same kind of thermoplatsic as that in the container 1 or cover 4 can with advantage be placed between the cover and the said flange.

The sleeve 2 consists of a tube of cardboard or other stiff material which is rolled back at its base. Base 3, which best consists of a single sheet of cardboard, rests on the collar 13.

Container 1 may be constructed in a number of different ways within the framework of the invention. The constructional form illustrated in FIG. 1 consists of a lower hemispherical portion 8 and an upper cylindrical portion 9. In this construction form the whole surface of the container is covered in folds, in the shape of double pleating, so that there are alternate ridges 11 and valleys 12 running from the centre 10 of the lower hemisphercal portion 8 up to the flange 6, where adjacent ridges meet on the outside of the container and adjacent valleys on the inside.

The construction of the combined package is shown in detail in FIG. 2 in a section taken immediately below flange 6, the wall thickness of the package being very greatly exaggerated. One method of constructing the fold pattern in the original laminate comprising an aluminium foil 20 coated on both sides with polyethylene is shown in the figure. By virtue of the fact that heat is supplied to container 1 after it has been folded, all the thermoplastic surfaces lying adjacent to one another are fused together. By this means, a continuous layer of plastic 21 on the inside of the container and a similar layer 22 on its outside, are formed. By making the height of the container have the correct proportion in relation to its width, it is possible to cause adjacent ridges, such as 11a and 11b, and adjacent valleys, such as 12a and 12b, to meet in the flange area 6, as the illustration in FIG. 1 shows. In this way, the wall material is made to have three layers in the flange area along the entire circumference of the container, the flange being thus given a largely even upper surface which is well suited to heat-sealing. Spaces 23 within ridges 11, which would form channels between the inside of the container and the surroundings if no preventive measures were taken, are completely filled by molten plastic which effectively prevents communication with the surroundings, and delamination of the layers of plastic and aluminium is also practically eliminated.

The creation of a largely even upper surface on flange 6 is greatly facilitated if the number of wall layers is the same at all points of the circumference of the flange. In the design illustrated this is equal to three. If the radius of container 1 is denoted r and the blank from which the container is produced has a radius R, we obtain the relationship $3r=R$, since owing to the folding in three layers the diameter of the blank must be three times as large as that of the finished container. Simple mathematics will further show that $$H \simeq r\left(4-\frac{\pi}{2}\right)$$

where H is the total height of container 1.

Another constructional form of the invention is illustrated in FIGS. 3 and 4. The inner container has here been denoted 1' and has the general shape of a right cylinder with a plane base. The thermoplastic-coated aluminium foil has retained the original character in the area of the base and is thus single-layered. On the other hand, the container 1' is covered in folds all over the cylindrical portion, the folds in the case being bent down—the container is single-pleated—and set in this position by means of heat-sealing. The outer sleeve as well as the closure of container 1' do not differ from those shown in the previous constructional form.

In order that it should be possible for contained 1' to have a flange 6 with three layers of aluminium, it is for the reasons mentioned earlier necessary that $3r=R$, the notation being the same as before. Simple mathematical calculations will further give the relationship between the height of container 1' and its radius as $H/r=2$. Container 1' thus has from the side the general shape of a square.

FIG. 4 shows a section through the wall of the container immediately below flange 6 and illustrates the principle of the construction of the material. There should be no further need for comment in connection with the figure, since with the guidance of what has been said before it should be easy to see how the aluminium foil 20' is fixed in its folded pattern by means of the molten layers of plastic, at the same time as the channels formed by the folding are sealed by the molten plastic.

It will be appreciated that it is possible to vary the designs very appreciably within the framework of the invention. It is thus possible to give the containers shapes that deviate from the cylindrical. It is further not necessary for all classes of use that the layers of thermoplastic should be melted along the whole folded surface of the container. If, for instance, only the area near the closure is heat-treated, most of the advantages of the invention will be realized. It is even possible to extend the folds in such a way that the material will contain more than three layers of aluminium. Also, the invention is naturally not restricted to the materials aluminium and polyethylene chosen as examples.

I claim:

1. A container having a wall section constituted by a laminate including an inner barrier layer faced on each side with a layer of thermoplastic material, said laminate being pleated to establish the final wall configuration of the container, and the thermoplastic material being fused together at the pleats to establish a continuous layer of thermoplastic material both at the inside and outside of the container.

2. A container as defined in claim 1 wherein said inner barrier layer of said laminate is constituted by aluminium and said facing layers are constituted by polyethylene.

3. A container as defined in claim 1 wherein said laminate is double pleated.

4. A container as defined in claim 1 wherein said laminate is single pleated.

5. A container as defined in claim 1 wherein said laminate is double pleated, the bottom of the container having a hemispherical configuration and the side being cylindrical.

6. A container as defined in claim 1 wherein said laminate is single pleated to establish a cylindrical side wall and the bottom wall of the container is planar and unpleated.

References Cited

UNITED STATES PATENTS

| | | | |
|---|---|---|---|
| 1,508,658 | 12/1924 | Jenkins | 161—103 X |
| 1,898,112 | 2/1933 | Wright | 229—14 X |
| 2,086,887 | 7/1937 | Wilcox | 229—14 X |
| 2,158,448 | 5/1939 | Wilcox | 229—14 |
| 2,200,200 | 5/1940 | Donnelly | 229—14 |
| 2,214,172 | 9/1940 | Moore | 229—3.5 X |
| 2,641,402 | 6/1953 | Brunn | 229—3.5 X |
| 2,711,382 | 6/1955 | Smith-Johannsen | 156—227 |

DAVIS T. MOORHEAD, *Primary Examiner.*

U.S. Cl. X.R.

156—226, 227; 161—103; 229—3.5